(12) United States Patent
Braun et al.

(10) Patent No.: US 11,346,397 B2
(45) Date of Patent: May 31, 2022

(54) METHOD FOR ENERGY-SAVING, LOW-WEAR OPERATION OF A GAS BEARING

(71) Applicant: Robert Bosch GmbH, Stuttgart (DE)

(72) Inventors: Jochen Braun, Heimsheim (DE); Sergei Hahn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 16/975,752

(22) PCT Filed: Feb. 26, 2019

(86) PCT No.: PCT/EP2019/054655
§ 371 (c)(1),
(2) Date: Aug. 26, 2020

(87) PCT Pub. No.: WO2019/166392
PCT Pub. Date: Sep. 6, 2019

(65) Prior Publication Data
US 2020/0408255 A1 Dec. 31, 2020

(30) Foreign Application Priority Data
Feb. 27, 2018 (DE) ...................... 10 2018 202 900.8

(51) Int. Cl.
*F16C 32/06* (2006.01)
*F04D 27/00* (2006.01)
(Continued)

(52) U.S. Cl.
CPC ........ *F16C 32/0614* (2013.01); *F04D 27/001* (2013.01); *F04D 27/0261* (2013.01); *F04D 29/057* (2013.01); *F16C 2326/20* (2013.01)

(58) Field of Classification Search
CPC .............. F16C 32/0614; F16C 32/0618; F16C 32/0622; F16C 32/0625; F16C 2326/20;
(Continued)

(56) References Cited

U.S. PATENT DOCUMENTS

| 5,603,154 A | 2/1997 | Steegmueller et al. |
| 6,353,273 B1 | 3/2002 | Heshmat et al. |

(Continued)

FOREIGN PATENT DOCUMENTS

| AU | 767175 B2 | 11/2003 |
| CN | 101418996 A | 4/2009 |

(Continued)

OTHER PUBLICATIONS

International Search Report for Application No. PCT/EP2019/054655 dated Jun. 26, 2019 (English Translation, 2 pages).

*Primary Examiner* — Phillip A Johnson
(74) *Attorney, Agent, or Firm* — Michael Best & Friedrich LLP

(57) ABSTRACT

A method (100) for operating a gas bearing (1), wherein the gas bearing is formed by a rotor (11) and a stator (12), wherein when there is rotation against a stator (12) with a lift-off rotational speed $n_L$ the rotor (11) changes from mixed friction with the stator (12) into fluid friction with a medium (13) located between the stator (12) and the rotor (11), wherein the rotational speed of the rotor (11) is kept at or above an idling rotational speed $n_I$, wherein—in response to a first information item (21), on the basis of which a change $\Delta F$ is to be expected in the acceleration forces F acting on the gas bearing (1), a new value of a safety factor $r_N:=n_I/n_L$ between the idling rotational speed $n_I$ and the lift-off rotational speed $n_L$ is determined (110), and/or—in response to a second information item (31), on the basis of which a change $\Delta n_L$ is to be expected in the lift-off rotational speed $n_L$, a new value $n_{L,neu}$ is determined for the lift-off rotational speed $n_L$ (120), wherein the idling rotational speed $n_I$ of the gas bearing (1) is adapted to the changed value of the safety factor $r_N$, and/or to the changed value $n_{L,neu}$ of the lift-off rotational speed $n_L$, (130). The invention further relates to an associated computer program.

17 Claims, 6 Drawing Sheets

(51) Int. Cl.
 *F04D 27/02* (2006.01)
 *F04D 29/057* (2006.01)
(58) Field of Classification Search
 CPC ... F04D 27/001; F04D 27/0261; F04D 29/057
 See application file for complete search history.

(56) References Cited

U.S. PATENT DOCUMENTS

| | | | |
|---|---|---|---|
| 9,257,707 B2* | 2/2016 | Milacic | H01M 8/04089 |
| 2013/0142671 A1* | 6/2013 | Stein | F04D 29/056 |
| | | | 417/231 |
| 2013/0335000 A1* | 12/2013 | Maier | H01M 8/04626 |
| | | | 320/101 |
| 2017/0241426 A1* | 8/2017 | Schmid | F16C 17/246 |

FOREIGN PATENT DOCUMENTS

| | | | |
|---|---|---|---|
| CN | 101707409 A | | 5/2010 |
| CN | 202579641 U | | 12/2012 |
| DE | 102011087912 | | 6/2013 |
| DE | 102012208762 | | 11/2013 |
| DE | 102013221119 | | 5/2015 |
| DE | 102014223126 | | 5/2016 |
| DE | 102015211447 | | 6/2016 |
| DE | 102015210574 | | 12/2016 |
| JP | H06311698 A | | 11/1994 |
| JP | 2007309126 A | | 11/2007 |
| KR | 20180018434 A | | 2/2018 |

* cited by examiner

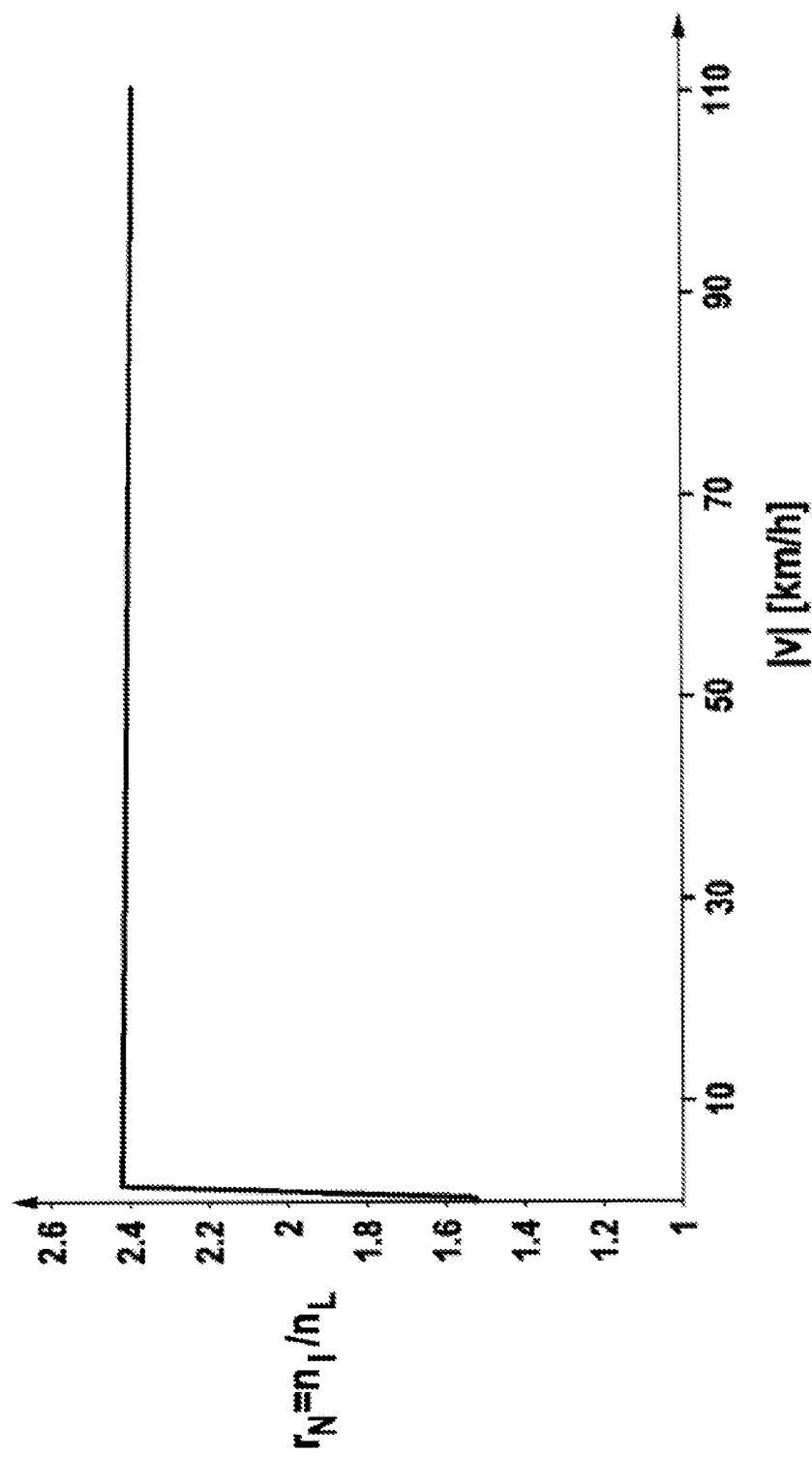

METHOD FOR ENERGY-SAVING, LOW-WEAR OPERATION OF A GAS BEARING

BACKGROUND OF THE INVENTION

The present invention relates to a method for operating gas bearings such as are usable for example in compressors for supplying fuel cell systems with air or combustion gas.

In the case of vehicles that have drive systems on the basis of fuel cells, the oxidizing agent used is in general oxygen from the ambient air in order to react in the fuel cell with a hydrogenous gas to form water (or water vapor) and in so doing to provide electrical power by means of electrochemical conversion.

It is generally necessary for this purpose to compress the ambient air in order to ensure sufficient oxygen partial pressure for the reaction and also to ensure an homogenous distribution as possible over a fuel cell stack and also to overcome the pressure losses in the system. Fuel cell systems that have compressors for the ambient air are known for example from DE 10 2011 087 912 A1.

The required pressures and mass flows of ambient air require the compressors to operate at high rotational speeds. Simultaneously, the supplied air must be free of oil, since the fuel cells would otherwise become contaminated and after a short time unusable. For this reason, gas bearings are preferably installed in compressors for the air supply of fuel cells since gas bearings are oil-free. Gas bearings of this type are known for example from DE 10 2013 221 119 A1.

SUMMARY OF THE INVENTION

Within the scope of the invention, a method for operating a gas bearing has been developed. The gas bearing is formed by means of a rotor and a stator. As the rotor rotates against a stator at a lift-off rotational speed $n_L$, said rotor transfers from a state of mixed friction with the stator into a state of fluid friction in which a medium is located between the stator and the rotor. The causes for this are aerodynamic effects and in this case in particular the build-up of a pressure cushion between the rotor and the stator. The rotational speed of the rotor is held at or above an idling rotational speed $n_I$. If the idling rotational speed $n_I$ is greater than the lift-off rotational speed $n_L$, direct mechanical contact between the rotor and the stator can be avoided.

The following features are performed individually or in combination:

In response to a first piece of information on the basis of which a change $\Delta F$ in the acceleration forces F that are acting on the gas bearing is to be expected, a new value of a safety factor $r_N := n_I/n_L$ between the idling rotational speed $n_I$ and the lift-off rotational speed $n_L$ is determined.

In response to a second piece of information on the basis of which a change $\Delta n_L$ in the lift-off rotational speed $n_L$ is to be expected, a new value $n_{L,new}$ of the lift-off rotational speed $n_L$ is determined.

The idling rotational speed $n_I$ of the gas bearing is adapted to the amended value of the safety factor $r_N$, and/or to the amended value of the lift-off rotational speed $n_L$.

In so doing, it is quite possible that the first piece of information and the second piece of information overlap, i.e. that possibly one and the same measured variable is relevant both for the change $\Delta F$ that is to be expected in the acceleration forces F and also for the change $\Delta n_L$ that is to be expected in the lift-off rotational speed $n_L$.

It is possible particularly in the case of mobile applications for high acceleration forces to act on the gas bearing, for example as a result of shocks to the rotor shaft unit. The restoring force that the gas bearing can exert depends upon the pressure of the pressure cushion in the gas bearing, and consequently on the prevailing rotational speed. If it is not possible for the restoring force to compensate the deflection of the rotor by means of the acceleration force, the rotor and the stator come into solid body contact with one another. Any such contact causes degradation as a result of the effects of friction. These contacts are therefore a "summated degradation" that eventually culminates in the malfunction of the gas bearing. It is usual therefore to provide a fixed safety factor $r_N$, for example between 2 and 3, between the idling rotational speed $n_I$ and the lift-off rotational speed $n_L$.

It has now been recognized that it is possible by means of dynamically reducing this safety factor $r_N$ to the absolutely necessary value on the one hand to save a lot of energy, since the energy consumption increases disproportionately with the rotational speed. Causes for this are the increasing frictional losses at a higher rotational speed. On the other hand, noise emissions are also considerably reduced.

It has been further recognized that the lift-off rotational speed of the gas bearing is not absolutely constant but rather that it can change on account of different influences. If these influences are monitored, it is possible for example to maintain the safety factor $r_N$ constant and to also apply each increase $\Delta n_L$ in the lift-off rotational speed $n_L$ multiplied by the safety factor $r_N$ to the idling rotational speed $n_I$. It is precisely such influences that hitherto belonged to the unknown variables that were a reason for the high value of the safety factor $r_N$. If they are quantified, then it is only necessary for the safety factor $r_N$ to cover the then still remaining unknown variables and said safety factor can be reduced accordingly.

In the simplest case, the initial values for the lift-off rotational speed $n_L$, the idling rotational speed $n_I$, and/or the safety factor $r_N$ can be predetermined as constant values. These values can however also be present as functions of one or multiple variables or also as a parameterized characteristic field or model.

Irrespective of whether the safety factor $r_N$, the lift-off rotational speed $n_L$ or both variables are amended, the end effect is a new idling rotational speed $n_I$ that can be set by way of the control device of the assembly that is allocated to the gas bearing. The updating procedure is performed for example by means of temporal clocking.

In a particularly advantageous manner, the first piece of information includes at least one measured value that is provided by an acceleration sensor. It is possible especially when used in a vehicle for gas bearings to be suddenly influenced by high acceleration forces. On the other hand, acceleration sensors are provided in each modern vehicle, for example in the ABS or ESP system. Since for example a fuel cell system generally requires a connection to the CAN bus of the vehicle and possibly the ABS or ESP system is likewise connected to the CAN bus, it is not necessary to provide either an additional sensor nor an additional wiring arrangement in order for the purpose of updating the safety factor $r_N$ for the operation of the gas bearing to measure the acceleration forces.

The acceleration forces that occur during the operation of a vehicle are seldom the product of a single shock or strike. They are more likely to be caused in general by means of a continuous interaction between the vehicle and the road surface on which the vehicle is being driven. A history of acceleration forces therefore provides particular information regarding the acceleration forces that are to be expected in the future. Advantageously, the acceleration forces F that are to be expected are therefore evaluated during a prognosis time period $T_P$ that lies in the future from a history that is collected during an observation time period $T_B$ of measured values that are provided by the acceleration sensor.

Typically, the state of one and the same road surface section does not change all of a sudden but rather only changes gradually. It is therefore possible at least to some extent with reference to a summary assessment of the state of the road surface section to predict the acceleration forces that occur. Advantageously, the first piece of information therefore includes at least one evaluation of a state of a road surface section on which a vehicle that has a gas bearing is located and/or of a road surface section that said vehicle is approaching. This evaluation can be obtained from any source. The evaluation can also be combined with other information, possibly with the signal from a pothole detector that is provided in the vehicle. For example, the evaluation and/or a measured variable that is significant for this evaluation can be obtained from a digital card, from an information service, which can be accessed by way of a network, and/or from another vehicle. Cartographical information regarding the prevailing state of the road surface consequently receives an added value to the extent that it renders it possible for vehicles that have gas bearings to be operated in a low-wear and simultaneously energy-saving manner.

In a further particularly advantageous embodiment, the first piece of information includes information that it is to be expected that a vehicle that has a gas bearing will be at a standstill for at least a predetermined time period. This includes both the case that the vehicle is currently already at a standstill and will continue to be at a standstill and also the case that the vehicle will only come to a stop in the future and will remain at a standstill for the predetermined time period. If it is to be expected that the vehicle will be at a standstill, it is possible to particularly greatly reduce the safety factor $r_N$ for a longer time period. In the extreme case, if the assembly that is provided in the vehicle and comprises the gas bearing is not required during the standstill time period, the rotor shaft unit of the gas bearing can be completely shut down.

If the rotor-shaft unit is shut down, the remaining rotational energy of the rotor is converted into heat by means of solid body contact with the stator once the lift-off rotational speed is less than the lift-off rotational speed $n_L$. Thus, the procedure of shutting down and subsequently restarting back up to the original rotational speed costs an energy contribution that is to be balanced out against the energy contribution that otherwise occurs when the gas bearing is idling. Furthermore, the solid body contact between the rotor and the stator is also always associated with a degradation of the two components that acts in the style of a summated degradation. Consequently each shut-down and re-start of the rotor-shaft unit has a detrimental effect on the life expectancy of the gas bearing. The time limit after which the standstill time period that is to be expected is regarded as sufficiently long for a complete shut-down of the rotor-shaft unit is used to weigh up the costs both in energy and also serviceable life against the energy contribution that otherwise occurs during idling.

In a further particularly advantageous embodiment of the invention, the second piece of information includes at least one measured value that relates to the ambient conditions under which the gas bearing is operated. Thus, for example, the lift-off rotational speed $n_L$ is dependent upon the ambient temperature and/or upon the atmospheric humidity.

If, for example, ambient air is the medium between the stator and the rotor, then the ambient conditions act directly on the medium and consequently also on its mechanical characteristics. The mechanical characteristics are however not automatically only determined hereby but rather they can also depend upon state variables of the medium that can only be measured within the gas bearing. It is thus possible for example as a result of friction effects at high rotational speeds for the temperature of the air as a medium of the gas bearing to increase considerably above the ambient temperature. The second piece of information therefore advantageously includes at least one measured value that relates to a state variable of the medium.

It is however also possible for the lift-off rotational speed $n_L$ to change for example as a result of aging or wear on the gas bearing. Consequently, the second piece of information advantageously includes at least one usage indicator of the gas bearing. For example, possible usage indicators are a number of operating hours or a cumulative number of start-stop procedures. It is thus possible for example for a gas bearing that has already experienced many start-stop procedures to be operated with an increased safety factor $r_N$ in order to avoid additional degradation. The usage indicator may also contain variables that are already relevant for the change $\Delta F$ that is to be expected in the acceleration forces F, and/or for the change $\Delta n_L$ that is to be expected in the lift-off rotational speed $n_L$.

Furthermore, the second piece of information can also be obtained from an applied model of the gas bearing. Such a model can determine from accessible variables in particular variables that are not accessible from the direct measurement. These accessible variables can be obtained for example by means of a measurement procedure or from a cloud.

In a further particularly advantageous embodiment, the idling rotational speed $n_I$ is updated in addition to a current or future load requirement on a device that has a gas bearing.

If, for example, the gas bearing is located in a compressor for the supply of combustion gas or oxidizing agent to a fuel cell or a fuel cell stack, then there is an expedient idling rotational speed $n_I$ for each mode of operation of the fuel cell or of the fuel cell stack, for example:

for the minimal load point at which the fuel cell stack outputs a minimal power;

for a mode of operation in which a small air mass flow is directed by way of an air bypass around the fuel cell stack without electrical power being output; or for a part load range in which one part of the air mass flow is directed into the fuel cell stack and another part is directed around it.

The actual rotational speed of the gas bearing is advantageously controlled and/or regulated by virtue of controlling a drive of the rotor-shaft unit of the gas bearing to the adapted idling rotational speed $n_I$. This transfers the adaptation of the idling rotational speed $n_I$ into a physical energy saving during the operation of the gas bearing. For example, it is possible for the adapted idling rotational speed $n_I$ to be supplied as a desired value or as a boundary condition to a rotational speed controller of the gas bearing, which in turn acts on the drive by way of a correcting variable.

The method is not only advantageous for gas bearings in compressors for mobile fuel cells. It can also be used for gas bearings in compressors for stationary fuel cells. In contrast to the driving operation, sudden shocks do not occur in the stationary state. It is possible for this reason for stationary fuel cells to be used over longer periods of time than vehicles so that the influence of usage and aging effects on the lift-off rotational speed $n_L$ then gain in importance.

Furthermore, the method can also be used for example for gas bearings that are installed in compressors for cooling agent, for example in refrigerators or air conditioning systems. In this case, the reduced idling rotational speed renders possible in a particularly advantageous manner an operation at a lower noise level.

The method can be implemented wholly or in part in software and in particular can provide an existing computer or control device with the ability to perform the method. In this respect, this software is an independently saleable product, for example for the aftermarket. The invention therefore also relates to a computer program that has machine-readable instructions that, when they are implemented on a computer and/or on a control device, cause the computer and/or the control device to perform the method in accordance with the invention. Likewise the invention relates to a machine-readable data carrier or to a download product that has the computer program.

BRIEF DESCRIPTION OF THE DRAWINGS

Further features that improve the invention are illustrated in detail below together with the description of the preferred exemplary embodiments of the invention with the aid of the figures.
In the drawings:
FIGS. 3a-c illustrate exemplary adaptations of the safety factor $r_N$ or rather of the lift-off rotational speed $n_L$.

DETAILED DESCRIPTION

Figure 1A:
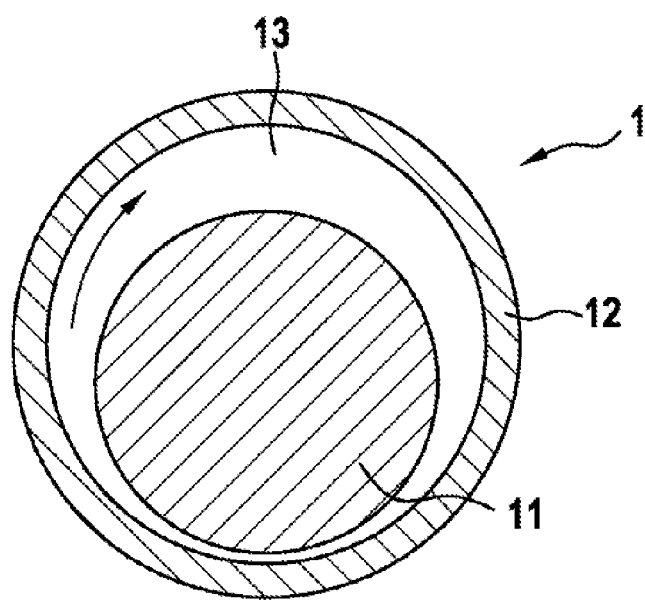
FIGS. 1a-c illustrate the principle structure of a gas bearing and the dependency of the coefficient of friction μ on the rotational speed n.

FIG. 1a illustrates a sectional drawing of the principle structure of a gas bearing 1 at a standstill or in a state in which the prevailing rotational speed n is less than the lift-off rotational speed $n_L$. The rotor 11 is rotatably supported against the stator 12 and lies against it. Moreover, the intermediate space between the rotor 11 and the stator 12 is filled with the medium 13, for example air. If the rotor 11 is rotated against the stator 12, which is indicated by the arrow, then a mixed friction occurs between the rotor 11 and the stator 12 on account of the solid body contact.

Figure 1B:
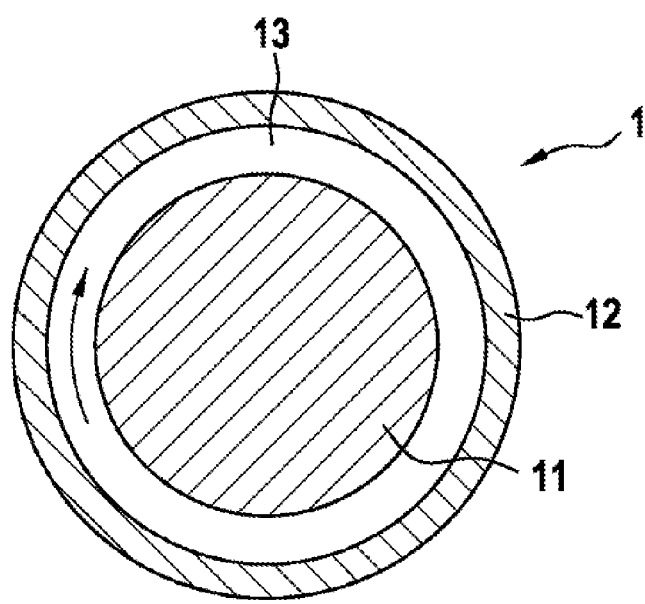

FIG. 1b illustrates the same gas bearing 1 in the state in which the prevailing rotational speed n is equal to or greater than the lift-off rotational speed $n_L$. The medium 13 now forms an all-round pressure cushion between the rotor 11 and the stator 12. In the event that the rotor 11 deflects radially against the stator 12, the pressure of the medium 13 is increased at the site where the rotor 11 approaches the stator 12. This exerts a restoring force that is directed against the deflection.

Figure 1C:
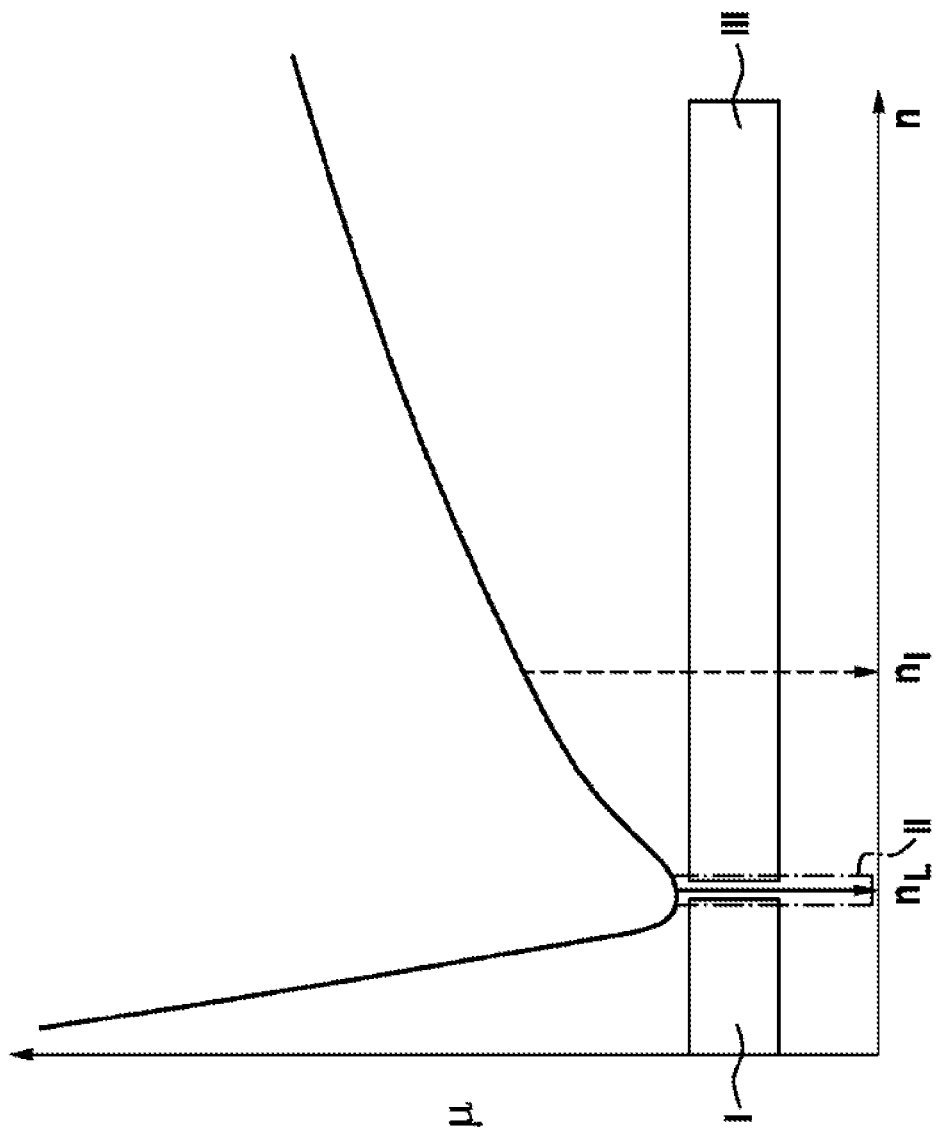

FIG. 1c illustrates the progression of the coefficient of friction μ in the gas bearing 1 as a function of the rotational speed n. In the range I of the mixed friction, the solid body friction between the rotor 11 and the stator 12 dominate. As the rotational speed n increases, the shape of the pressure cushion of the medium 13 increasingly acts against the force that pushes the rotor 11 against the stator 12. Consequently, the coefficient of friction μ reduces on balance. The minimum of the coefficient of friction μ is realized in the case of the lift-off rotational speed $n_L$ in the transition range II between the mixed friction and the pure fluid friction. In this case, precisely the solid body friction between the rotor 11 and the stator 12 is eliminated while simultaneously the fluid friction of the rotor 11 against the medium 13 is not yet very pronounced.

An idling rotational speed $n_I$ is now selected for a low-wear operation of the gas bearing 1, said idling rotational speed being in the range III of the pure fluid friction between the rotor 11 and the medium 13. In so doing, it is cost-effective with regard to the energy consumption if $n_I$ is as close as possible to $n_L$ since the fluid friction increases considerably as the rotational speed n increases. On the other hand, as $n_I$ moves closer to $n_L$, there is the risk that in the event of a sudden effect of force on the gas bearing 1 solid body contact could occur between the rotor 11 and the stator 12. The method in accordance with the invention provides in this case an optimal trade-off, i.e. the idling rotational speed $n_I$ is reduced as far as possible in the case of an acceptable risk of solid body contact occurring.

Figure 2:
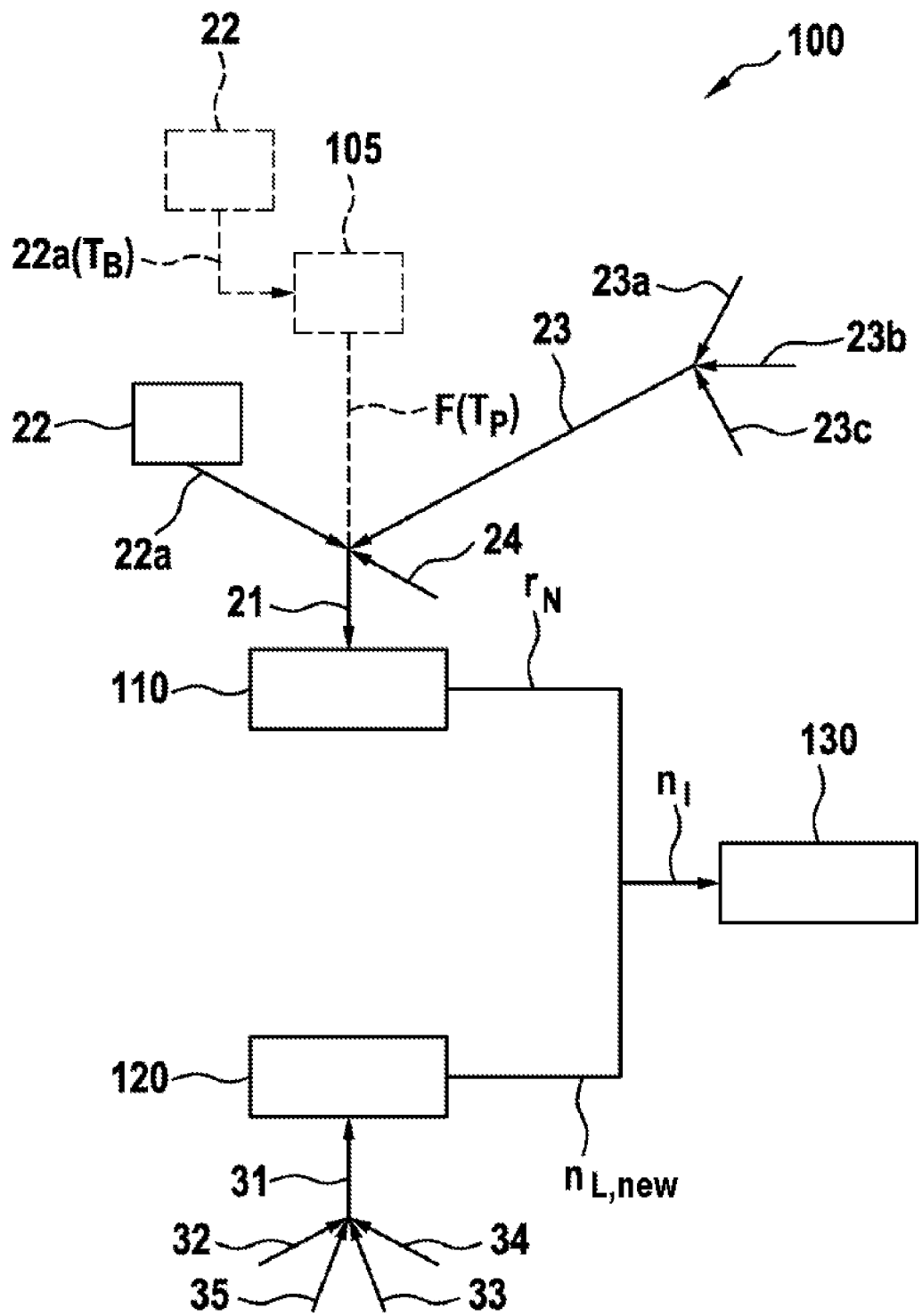
FIG. 2 exemplary embodiment of the method 100.

FIG. 2 illustrates an exemplary embodiment of the method 100. In accordance with step 110, a new value of the safety factor $r_N$ between the idling rotational speed $n_I$ and the lift-off rotational speed $n_L$ is determined in response to a piece of information 21 that a change ΔF is to be expected in the acceleration forces F that are acting on the gas bearing. The piece of information 21 can originate from different sources that can also be combined with one another.

It is thus possible for the piece of information 21 to include a measured value 22a that is provided by an acceleration sensor 22. Measured values 22a that are provided by the acceleration sensor 22 can however also be obtained for example during an observation time period $T_B$ and in the optional step 105 they can be used during a prognosis time period $T_P$ that lies in the future to evaluate the acceleration forces F that are to be expected. It is possible in this manner to update the safety factor $r_N$ for example of the changing quality of a road surface which is being driven over by a vehicle that has a gas bearing 1. However, it is also possible for example to obtain an already finished evaluation 23 of a road surface section that is currently being driven over or that will be driven over in the near future from any source, for example from a digital card 23a, from an information service (cloud) 23b, which can be accessed by way of a network, and/or from another vehicle 23c (possibly by way of a vehicle-to-vehicle communication). It is also possible to use a piece of information 24 that it is to be expected that the vehicle that has the gas bearing will be at a standstill for at least a predetermined time period. As previously described, this includes both the case that a prevailing standstill state continues and also the case that the standstill state only occurs in the future. It is therefore possible to use information both regarding the current state of movement of the vehicle and also regarding the predictive state of movement of the vehicle.

As an alternative thereto or also in combination therewith, it is possible in step 120 to determine a new value $n_{L,new}$ for the lift-off rotational speed $n_L$ in response to a piece of information 31 that the lift-off rotational speed $n_L$ will change. The piece of information 31 can include for example measured values 32 of ambient conditions, measured values 33 of state variables of the medium 13, and/or usage indicators 34 of the gas bearing 1. Furthermore, the piece of information 31 can also be determined using an applied model 35 of the gas bearing 1, which is evaluated for example in the control device. It is possible for example to determine conditions of the gas bearing 1, such as a temperature, at least approximately from such a model 35 in order to forego additional sensors.

Irrespective of whether the step 110 or 120 is performed individually or in combination, the end effect is a new idling rotational speed $n_I$. This is set in step 130 on the gas bearing 1 and in so doing it is possible in addition to update a current or future load requirement on a device that has a gas bearing 1. It is possible in this manner to more or less avoid that the rotational speed n needs to be suddenly accelerated in order to fulfill the load requirement.

FIG. 3 illustrates as an example different adjustments to the safety factor $r_N$ or to the lift-off rotational speed $n_L$.

In FIG. 3a, the safety factor $r_N$ is plotted dependent upon the absolute velocity of a vehicle that has a gas bearing 1. The safety factor $r_N$ that is normally 2.4 has considerably reduced to 1.5 for the vehicle at a standstill and rapidly increases back to 2.4 as soon as the vehicle is moved. The method is equally active when the vehicle is traveling forwards or backwards.

Figure 3B:
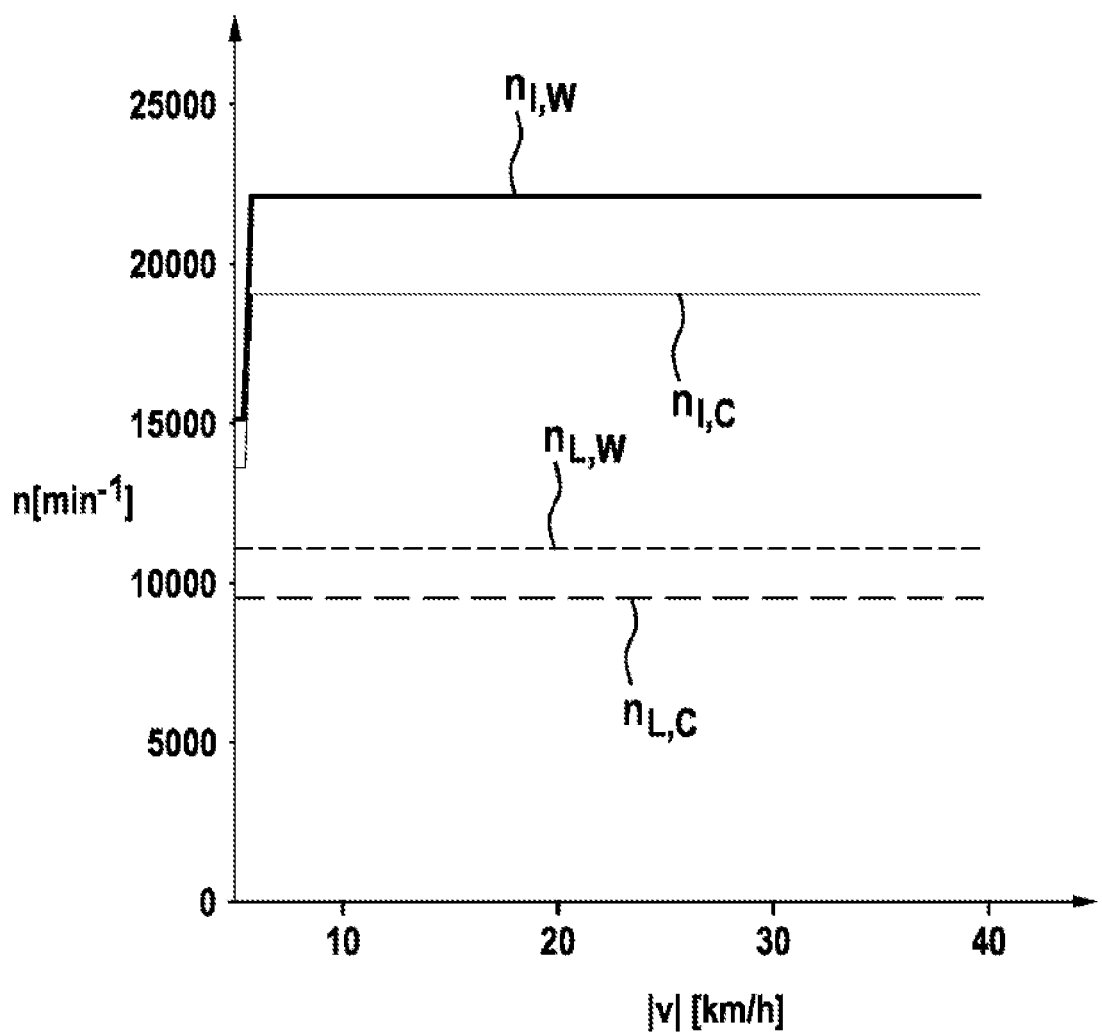

FIG. 3b illustrates the effects a temperature change has on the lift-off rotational speed $n_L$. The rotational speeds n are plotted against the absolute vehicle velocity |v|.

In the case of a cold temperature, the lift-off rotational speed $n_L$ is at a first level $n_{L,C}$. In the case of a warm temperature, the lift-off rotational speed $n_L$ is at a second, higher level $n_{L,W}$. In the case of an identical safety factor $r_N$, this leads to the idling rotational speed $n_I$ at a warm temperature (curve $n_{I,W}$) being higher than the idling rotational speed $n_I$ in the case of a cold temperature (curve $n_{I,C}$).

Similar to FIG. 3a, the safety factor $n_R$ is reduced for a vehicle that is at a standstill, i.e. when the vehicle is at a standstill, the idling rotational speed $n_I$ both in the case of a cold temperature and also in the case of a warm temperature respectively is considerably lower than when the vehicle is traveling.

Figure 3C:
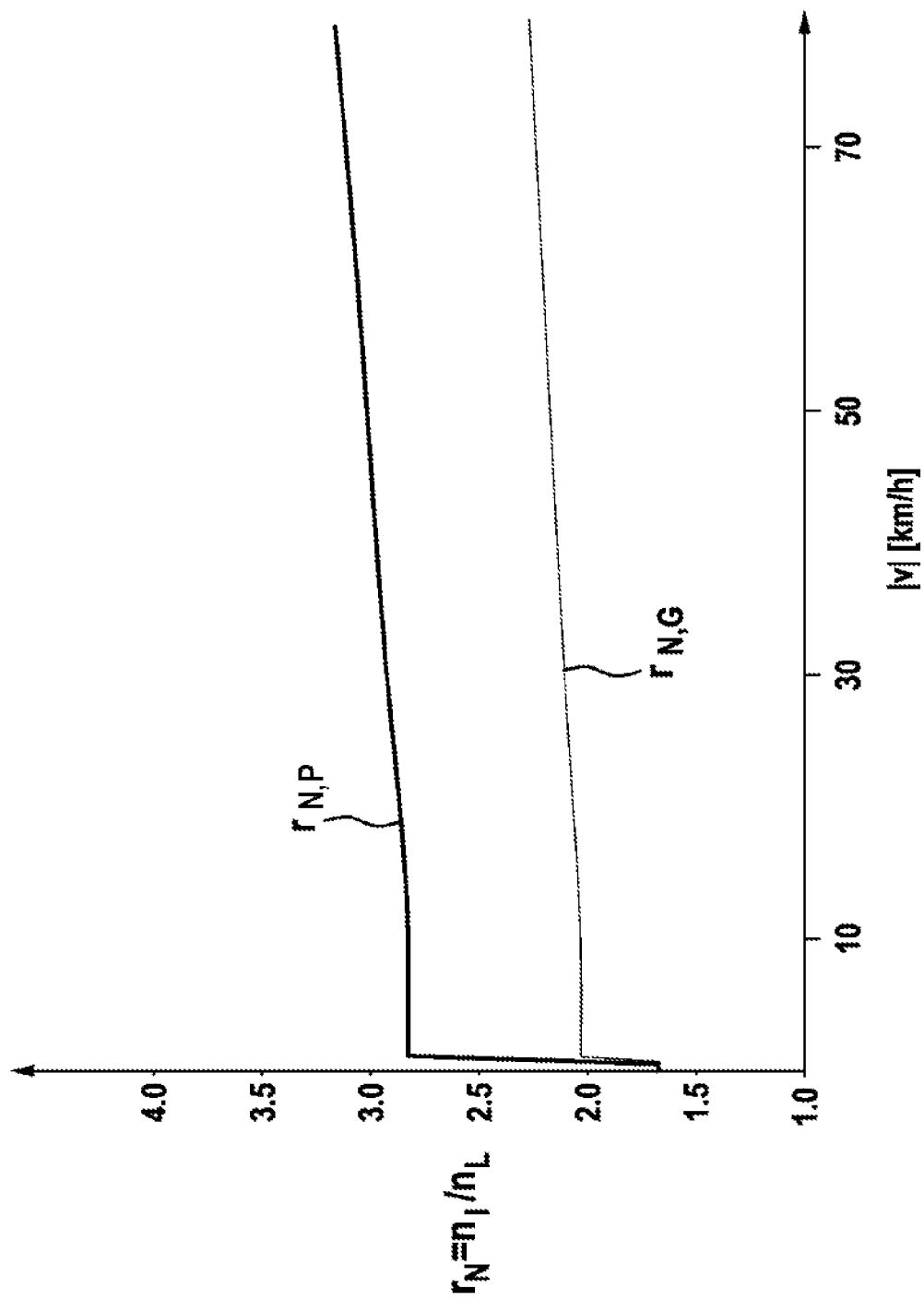

In FIG. 3c, as an example, the safety factor $r_N$ is plotted against vehicle velocity v and in fact once for a good road surface state (curve $r_{N,G}$) and once for a poor road surface state (curve $r_{N,P}$).

When the vehicle is at a standstill, it is not possible for the road surface state as such to produce any shocks on the gas bearing 1. The safety factors $r_{N,G}$ and $r_{N,P}$ are therefore identical for the two road surface states under consideration. However, if the vehicle is moved, the safety factor $r_{N,P}$ increases for a poor road surface to a considerably higher level than the safety factor $r_{N,G}$ for a good road surface. Furthermore, in contrast to FIG. 3a, the safety factors $r_{N,G}$ and $r_{N,P}$ are not constant as the vehicle is moving but rather increase as the velocity v increases. Consequently, consideration is given to the condition that sudden shocks as a result of the vehicle traveling over an uneven road surface at higher velocities lead to greater effects of force on the gas bearing 1.

The invention claimed is:

1. A method (100) for operating a gas bearing (1), wherein the gas bearing (1) is formed by a rotor (11) and a stator (12), wherein as the rotor (11) rotates against a stator (12) at a lift-off rotational speed $n_L$ said rotor transfers from a state of mixed friction with the stator (12) into a state of fluid friction with a medium (13) located between the stator (12) and the rotor (11), wherein the rotational speed of the rotor (11) is held at or above an idling rotational speed $n_I$, wherein:

in response to a first piece of information (21) on the basis of which a change ΔF in the acceleration forces F that are acting on the gas bearing (1) is to be expected, a new value of a safety factor $r_N:=n_I/n_L$ between the idling rotational speed $n_I$ and the lift-off rotational speed $n_L$ is determined (110), wherein the first piece of information (21) includes at least one measured value from an acceleration sensor (22) and the idling rotational speed $n_I$ of the gas bearing (1) is adapted to the amended value of the safety factor $r_N$.

2. The method (100) as claimed in claim 1, wherein the acceleration forces F that are to be expected are evaluated during a prognosis time period $T_P$ that lies in the future from a history that is collected during an observation time period $T_B$ of measured values (22a) that are provided by the acceleration sensor (22) (105).

3. The method (100) as claimed in claim 2, wherein the first piece of information includes at least one evaluation (23) of a state of the road surface section on which a vehicle that has the gas bearing (1) is located, and/or of a road surface section that said vehicle is approaching.

4. The method (100) as claimed in claim 3, wherein the evaluation (23) and/or a measured variable that is related to the evaluation (23), are obtained from a digital card (23a), and/or from an information service (23b), which can be accessed by way of a network or from another vehicle (23c).

5. The method (100) as claimed in claim 4, wherein the first piece of information (21) includes a piece of information (24) that a vehicle that has the gas bearing (1) is expected to be at a standstill for at least a predetermined time period.

6. The method (100) as claimed in claim 5, wherein the idling rotational speed $n_I$ is updated in addition to a current or future load requirement on a device that has the gas bearing (1) (130), and wherein the actual rotational speed of the gas bearing (1) is controlled and/or regulated by virtue of controlling a drive of the rotor-shaft unit of the gas bearing (1) to the adapted idling rotational speed $n_I$.

7. The method (100) as claimed in claim 1, wherein the first piece of information includes at least one evaluation (23) of a state of the road surface section on which a vehicle that has a gas bearing (1) is located and/or of a road surface section that said vehicle is approaching.

8. The method (100) as claimed in claim 7, wherein the evaluation (23) and/or a measured variable that is related to the evaluation (23), are obtained from a digital card (23a), from an information service (23b), which can be accessed by way of a network, and/or from another vehicle (23c).

9. The method (100) as claimed in claim 1, wherein the first piece of information (21) includes a piece of information (24) that a vehicle that has the gas bearing (1) is expected to be at a standstill for at least a predetermined time period.

10. The method (100) as claimed in claim 1, wherein in response to a second piece of information (31) on the basis of which a change $\Delta n_L$ in the lift-off rotational speed $n_L$ is to be expected, a new value $n_{L,new}$ of the lift-off rotational speed $n_L$ is determined (120), wherein the idling rotational speed $n_I$ of the gas bearing (1) is adapted to the amended value of the rotational speed $n_{L,new}$ of the lift-off rotational speed $n_L$ (130), and wherein the second piece of information (31) includes a measured value (32) that relates to the ambient conditions under which the gas bearing (1) is being operated.

11. The method (100) as claimed in claim 10, wherein the second piece of information (31) includes at least one measured value (33) that relates to a state variable of the medium (13).

12. The method (100) as claimed in claim 10, wherein the second piece of information (31) includes at least one usage indicator (34) of the gas bearing (1).

13. The method (100) as claimed in claim 10, wherein the second piece of information (31) is determined by a model (35) of the gas bearing (1).

14. The method (100) as claimed in claim 1, wherein the idling rotational speed $n_I$ is updated in addition to a current or future load requirement on a device that has the gas bearing (1) (130).

15. The method (100) as claimed in claim 1, wherein the actual rotational speed of the gas bearing (1) is controlled or regulated by virtue of controlling a drive of the rotor-shaft unit of the gas bearing (1) to the adapted idling rotational speed $n_I$.

16. The method (100) as claimed in claim 1, wherein the gas bearing (1) is located in a compressor for the supply of a combustion gas or oxidizing agent to a fuel cell.

17. A computer program that has machine-readable instructions that, when implemented on a computer and/or on a control device, cause the computer and/or the control device to perform the method of claim 1.

* * * * *